(12) United States Patent
Webster et al.

(10) Patent No.: US 8,121,450 B2
(45) Date of Patent: Feb. 21, 2012

(54) COUPLING BETWEEN FREE SPACE AND OPTICAL WAVEGUIDE USING ETCHED COUPLING SURFACES

(75) Inventors: Mark Webster, Bethlehem, PA (US); Vipulkumar Patel, Breinigsville, PA (US); Mary Nadeau, Alburtis, PA (US); Prakash Gothoskar, Allentown, PA (US); David Piede, Allentown, PA (US)

(73) Assignee: Lightwire, Inc., Allentown, PA (US)

( * ) Notice: Subject to any disclaimer, the term of this patent is extended or adjusted under 35 U.S.C. 154(b) by 101 days.

(21) Appl. No.: 12/316,540

(22) Filed: Dec. 11, 2008

(65) Prior Publication Data

US 2009/0162013 A1 Jun. 25, 2009

Related U.S. Application Data

(60) Provisional application No. 61/007,394, filed on Dec. 12, 2007, provisional application No. 61/062,923, filed on Jan. 30, 2008.

(51) Int. Cl.
*G02B 6/32* (2006.01)
*G02B 6/26* (2006.01)
*G02B 6/42* (2006.01)

(52) U.S. Cl. ............................. 385/38; 385/33; 385/39

(58) Field of Classification Search .................... 385/33, 385/38, 39
See application file for complete search history.

(56) References Cited

U.S. PATENT DOCUMENTS

| 5,142,596 | A | * | 8/1992 | Mizuuchi et al. ............ 385/43 |
| 5,605,600 | A | * | 2/1997 | Muller et al. ............... 438/695 |
| 6,214,178 | B1 | | 4/2001 | Chakrabarti et al. |
| 6,253,007 | B1 | * | 6/2001 | Laughlin ................... 385/34 |
| 6,263,133 | B1 | * | 7/2001 | Hamm ...................... 385/33 |
| 6,328,482 | B1 | * | 12/2001 | Jian .......................... 385/88 |
| 6,625,350 | B2 | * | 9/2003 | Kikuchi et al. ............. 385/33 |
| 6,643,068 | B2 | * | 11/2003 | Mandella ................... 359/628 |
| 6,647,183 | B2 | * | 11/2003 | Blank et al. ................ 385/38 |
| 6,751,379 | B2 | * | 6/2004 | Capewell et al. ........... 385/36 |

(Continued)

FOREIGN PATENT DOCUMENTS

JP 07-152055 6/1995

OTHER PUBLICATIONS

Almeida, et al., "Nanotaper for Compact Mode Conversion", Optics Letters/vol. 28, No. 15/ Aug. 1, 2003, 2003 Optical Society of America.

*Primary Examiner* — Rhonda Peace
(74) *Attorney, Agent, or Firm* — Wendy W. Koba

(57) ABSTRACT

A plasma-based etching process is used to specifically shape the endface of an optical substrate supporting an optical waveguide into a contoured facet which will improve coupling efficiency between the waveguide and a free space optical signal. The ability to use standard photolithographic techniques to pattern and etch the optical endface facet allows for virtually any desired facet geometry to be formed—and replicated across the surface of a wafer for the entire group of assemblies being fabricated. A lens may be etched into the endface using a properly-defined photolithographic mask, with the focal point of the lens selected with respect to the parameters of the optical waveguide and the propagating free space signal. Alternatively, an angled facet may be formed along the endface, with the angle sufficient to re-direct reflected/scattered signals away from the optical axis.

18 Claims, 8 Drawing Sheets

U.S. PATENT DOCUMENTS

| | | |
|---|---|---|
| 6,813,417 B2 | 11/2004 | Oh et al. |
| 6,821,900 B2 * | 11/2004 | Athavale et al. .............. 438/700 |
| 6,884,327 B2 | 4/2005 | Pan et al. |
| 6,912,345 B2 | 6/2005 | Dautartas et al. |
| 6,985,646 B2 * | 1/2006 | Blauvelt et al. ................. 385/14 |
| 6,987,912 B2 | 1/2006 | Morse |
| 6,993,225 B2 | 1/2006 | Patel et al. |
| 7,013,067 B2 | 3/2006 | Ghiron et al. |
| 7,024,074 B2 * | 4/2006 | Capewell ....................... 385/31 |
| 7,031,562 B2 | 4/2006 | Paddon et al. |
| 7,049,672 B2 * | 5/2006 | Headley et al. ............... 257/437 |
| 7,065,272 B2 | 6/2006 | Taillaert et al. |
| 7,079,741 B2 | 7/2006 | Furuyama |
| 7,162,124 B1 | 1/2007 | Gunn, III et al. |
| 7,190,864 B2 | 3/2007 | Jiang et al. |
| 7,251,406 B2 | 7/2007 | Luo et al. |
| 7,274,835 B2 | 9/2007 | Panepucci et al. |
| 7,285,433 B2 * | 10/2007 | Kretchmer et al. ............. 438/24 |
| 7,376,317 B2 | 5/2008 | Yamada |
| 7,415,184 B2 | 8/2008 | Ghiron et al. |
| 7,428,358 B2 | 9/2008 | Lu et al. |
| 2002/0097956 A1 * | 7/2002 | Kikuchi et al. .................. 385/33 |
| 2002/0131699 A1 * | 9/2002 | Raguin et al. .................... 385/33 |
| 2003/0161363 A1 * | 8/2003 | Wolf et al. ....................... 372/34 |
| 2003/0161603 A1 * | 8/2003 | Nadeau et al. ................ 385/137 |
| 2007/0031088 A1 | 2/2007 | Lu |
| 2008/0105940 A1 | 5/2008 | Piede et al. |

* cited by examiner

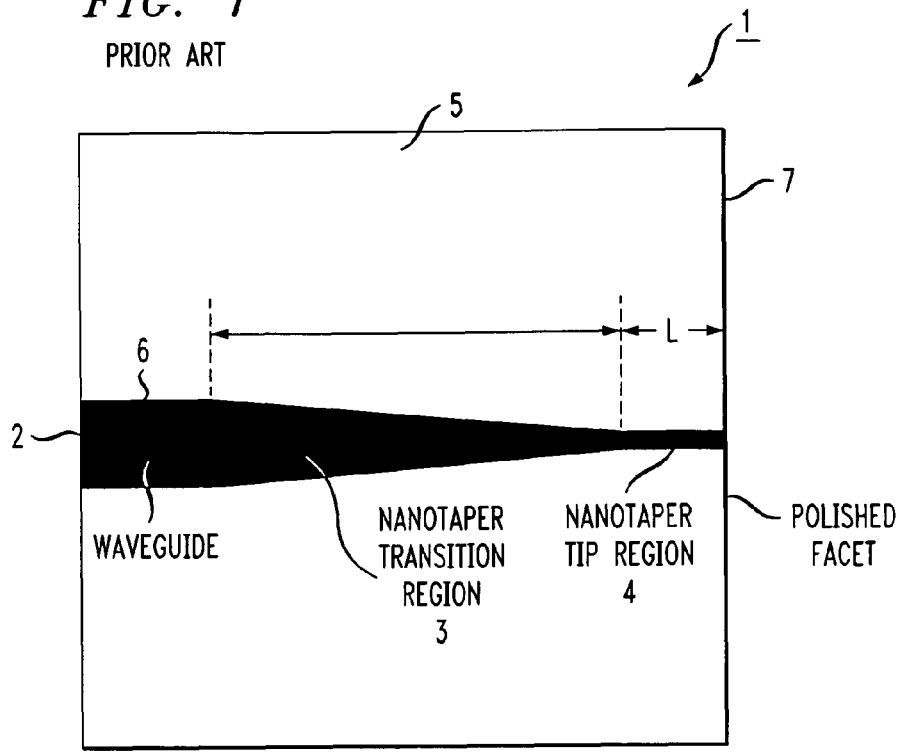
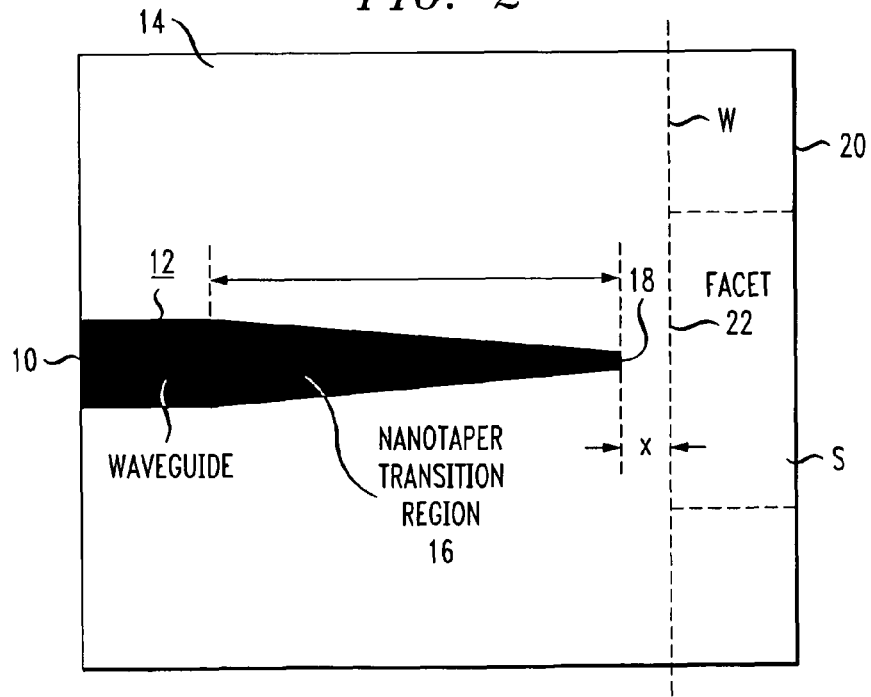

COUPLING BETWEEN FREE SPACE AND OPTICAL WAVEGUIDE USING ETCHED COUPLING SURFACES

CROSS-REFERENCE TO RELATED APPLICATIONS

This application claims the benefit of U.S. Provisional Application No. 61/007,394 filed Dec. 12, 2007 and U.S. Provisional Application No. 61/062,923 filed Jan. 30, 2008.

TECHNICAL FIELD

The present invention relates to an arrangement for coupling into and out of an optical waveguide and, more particularly, to the utilization of etched coupling facets along an optical waveguide endface.

BACKGROUND OF THE INVENTION

Coupling light into (and/or out of) an optical waveguide is a key requirement for any optical or opto-electronic integrated circuit arrangement. Several approaches commonly used in the art include, for example, grating couplers, prism couplers and "end-fire" couplers (i.e., coupling into an optical facet along an endface of an optical substrate). End-fire coupling, for example, into a nanotaper structure formed on an optical substrate offers advantages of simplicity, wide bandwidth of operation and (potentially) polarization independent operation. See, for example, an article entitled *"Nanotaper for compact mode conversion"* by V. R. Almeida et al., appearing in *Optics Letters*, Vol. 28, No. 15, Aug. 1, 2003.

One remaining difficulty with end-fire coupling, however, is the need for facet preparation of the waveguide at the endface of the optical substrate. In order to maximize coupling efficiency between a free space signal and the waveguide, the endface facet of the waveguide substrate should be as smooth as possible (i.e., "optically smooth") so as to limit the effects of scattering and reflections. In most conventional systems, optical polishing and/or cleaving operations are used to create the waveguide endface facet. Facet polishing, however, is a time consuming process that is not considered to be readily compatible with low-cost, wafer-scale production. The cleaving process has its own limitations, primarily associated with cleaving a crystalline material with the crystal cleavage planes required for the input/output coupling locations.

Thus, a need remains in the art for providing optically smooth coupling facets in a manner that is compatible with low-cost, wafer-scale production.

SUMMARY OF THE INVENTION

The need remaining in the prior art is addressed by the present invention which relates to an arrangement for coupling into and out of an optical waveguide and, more particularly, to the utilization of etched coupling facets along an optical waveguide endface.

In accordance with the present invention, a plasma-based etching process is used to specifically shape the endface of the optical substrate supporting the optical waveguide into a contoured facet which will improve coupling efficiency. The ability to use standard photolithographic techniques to pattern and etch the optical endface facet allows for virtually any desired facet geometry to be formed—and replicated across the surface of a wafer for the entire group of assemblies being fabricated.

In one embodiment, a precisely curved contour is etched into the substrate endface using a properly-defined photolithographic mask so as to create a "lens" coupling feature, with the focal point of the lens selected with respect to the parameters of the optical waveguide and the propagating free space signal. By virtue of using an etched-based fabrication process, multiple "lens" elements may be formed and used in a compound configuration. Alternatively, an angled facet may be formed along the endface, with the angle sufficient to re-direct reflected/scattered signals away from the optical axis. Advantageously, the use of an etch process to form the angled facet (as compared to prior art polishing/cleaving) provides improved control and accuracy of the angle created with respect to the plane of the endface. Specifically, the limitations associated with cleaving along only well-defined crystallographic planes is eliminated by using an etch process in accordance with the present invention.

It is an advantage of the present invention that the use of an etching technique to prepare the coupling facet allows for a plurality of coupling facets to be simultaneously formed for an array of waveguides formed along a substrate surface. Indeed, the patterning and etching processes allow for precise alignment between each waveguide endface and its associated coupling facet to be achieved.

It is an aspect of the present invention that the use of plasma etching in facet preparation allows for wafer-scale processing to be used. That is, the entire wafer (or a portion thereof) may be patterned and etched in one step to form a specific endface contour for each optical assembly fabricated across the wafer. These facets will be essentially uniform, an improvement over using the polishing/cleaving processes of the prior art. Moreover, the creation of the optical coupling facets at the wafer level allows for wafer-level testing to be performed at reduced cost and complexity when compared with prior art processes requiring facet preparation and testing at the individual component level.

In a preferred embodiment, the optical substrate is a component of a high refractive index contrast system, such as an $Si/SiO_2$ system—also referred to in the art as an SOI-based optical system (the abbreviation "SOI" referring to silicon-on-insulator). In this preferred embodiment, it is further considered preferred to have the endface of the waveguide pulled back somewhat from the substrate endface, particularly if the waveguide is formed in a nanotaper geometry. That is, since refractive index discontinuity between the silicon substrate (n=3.5) and the surrounding ambient (air, n=1) is greater than the discontinuity between silicon (n=3.5) and silicon dioxide (n=1.5), a larger portion of an incoming free space propagating signal will be lost by scattering and reflecting if the waveguide endface is exposed to the ambient. It is to be understood, however, that the etched-based facet preparation process of the present invention is equally applicable to other silicon-based optical systems, such as those utilizing silicon oxynitride or silicon nitride waveguiding arrangements.

The use of a nanotaper configuration is considered to be preferable in that the optical mode size is larger and further improves coupling efficiency and alignment tolerance with the optical mode. However, the use of a nanotaper is considered to be optional and not required for utilization of the etched facet preparation process of the present invention.

Other and further advantages and embodiments of the present invention will become apparent during the course of the following discussion and by reference to the accompanying drawings.

BRIEF DESCRIPTION OF THE DRAWINGS

Referring now to the drawings,

FIG. 1 is a top view of a conventional prior art "end-fire" nanotaper waveguide coupling arrangement;

FIG. 2 is a top view of an exemplary nanotaper waveguide coupling arrangement including an etched coupling facet formed in accordance with the present invention;

DETAILED DESCRIPTION

Figure 3:
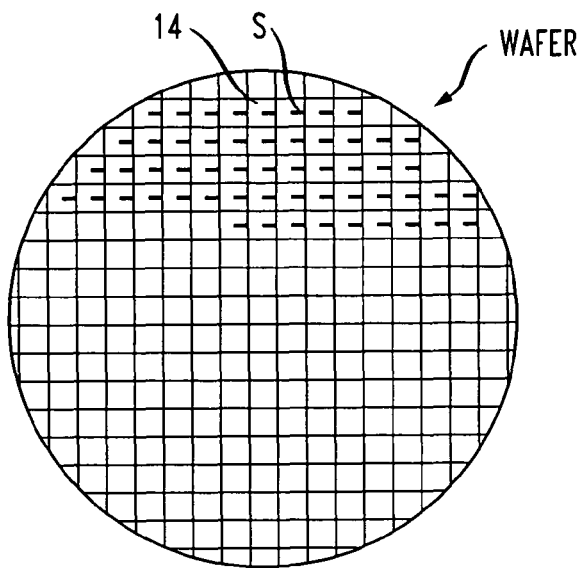
FIG. 3 is a generalized view of an exemplary wafer which may be processed to form a plurality of etched facets on a plurality of optical structures formed therein.

FIG. 1 is a top view of an exemplary optical substrate 1 formed to include an optical waveguide 2 which also includes a nanotaper transition region 3 and a nanotaper tip region 4. It is presumed for the purposes of the present discussion that optical substrate 1 is an SOI-based substrate comprising a base layer of silicon (not shown in this top view), an overlying dielectric (silicon dioxide) layer 5 (also referred to as "buried oxide layer 5" or "BOX layer 5" in the following) and a single crystal, sub-micron thick silicon surface layer 6 (also referred to as SOI layer 6).

Using conventional CMOS processing technology, optical waveguide 2 (as well as adjoining regions 3 and 4) are formed within SOI layer 6. The remainder of the exposed surface in this top view is, therefore, BOX layer 5. As mentioned above, one prior art technique for preparing nanotaper tip region 4 to receive an optical signal is to polish the endface of the optical substrate. In the arrangement of FIG. 1, this would require polishing endface 7 of substrate 1. Inasmuch as conventional polishing techniques (such as, for example, chemical-mechanical polishing systems) cannot control the endpoint of the polishing process to submicron dimensions, nanotaper tip region 4 needs to be formed of a predetermined length L to accommodate for this polishing inaccuracy. While needing to provide this additional tip region, the prior art polishing method also suffers from the scattering and reflection problems discussed above. Formation of the endface facet using a prior art cleaving process also suffers from drawbacks, particularly related to locating and defining the crystalline plane used to create the cleave.

It is to be understood that the prior art illustration of FIG. 1, as well as the remaining drawings illustrating the present invention, do not illustrate every feature of the final structure (for the sake of clarity). In particular, a dielectric layer is usually included as a top, covering layer (referred to as an "interlevel dielectric layer" or "ILD" in the art), but is not illustrated so that waveguide 2 is visible in a top view. Additionally, it is to be understood that while the prior art arrangement of FIG. 1 and the following drawings describe the use of an "SOI structure" and/or "SOI layer", the etched coupling facets of the present invention may be used with other material systems within which optical waveguides are formed including, but not limited to, silicon oxynitride optical waveguides or silicon nitride optical waveguides.

FIG. 2 illustrates an etched facet formed in accordance with the present invention to provide coupling between an optical waveguide and a free space optical signal. An optical waveguide 10 is shown as formed in an SOI layer 12 of an SOI-based optical arrangement (which includes a silicon base layer, not shown, and an overlying BOX layer 14). In this particular example, optical waveguide 10 is formed to include a nanotaper transition region 16, where as discussed above, the use of a nanotaper is beneficial in situations where a larger optical mode size at the coupling interface is desired.

In accordance with the present invention and as further shown in FIG. 2, an etched coupling facet 22 is shown as being formed by removing a portion of BOX layer 14 from the area between nanotaper transition region 16 and SOI structure endface 20 (shown as shaded portion S in FIG. 2). More specifically, the waveguide cladding material—including both BOX layer 14 and the overlying ILD layer (not shown)—are removed by the etching process. The remainder of this discussion will thus refer to the removal of the "waveguide cladding material", which is understood to include both BOX layer 14 and any overlying ILD cladding layer which may be presented. Again, as mentioned above, the etched coupling facet of the present invention may be used with other types of optical waveguides, such as silicon nitride waveguides or silicon oxynitride waveguides.

A conventional patterning technique is used to define the boundaries of shaded portion S, so that a like area may be removed from each optical assembly formed across an entire wafer (see FIG. 3 for a wafer-level illustration, showing a plurality of patterned areas to be removed to form coupling facets). Indeed, and as will be discussed in detail hereinbelow, the specific geometry (variously referred to also as "contour") of the region removed by etching is at the discretion of the user. For example, it is possible to remove an entire width of the waveguide cladding material from endface 20 (shown by the dotted line "W" in FIG. 2), creating an etched facet endface 22 across the entire width of the optical substrate.

In the particular embodiment of the present invention as shown in FIG. 2, nanotaper transition region 16 is formed to include an endpoint termination 18 (hereinafter referred to as "tip 18") which is disposed at a location which is pulled back from etched facet 22 formed in the manner described above.

Several advantages have been discovered when using this pulled back placement of tip 18 of nanotaper transition region 16. First, when tip 18 is located at the coupling facet, it will be exposed to air, which has a lower refractive index than BOX layer 14. This difference in refractive index causes an increased portion of the incoming light signal to be scattered at tip 18, significantly reducing coupling efficiency into nanotaper 16. Moreover, as will be discussed in detail hereinbelow, the pulled back location of nanotaper tip 18 allows for the facet 22 to be shaped, using standard photolithographic patterning and etching processes, to form various facet geometries which will further increase coupling efficiency. The thickness "x" of the remaining waveguide cladding material beyond tip 18 is also defined by this photolithographic process; obviously, the dimensions of the portion removed by the etching process are at the discretion of the designer.

A significant benefit of the arrangement of the present invention is that a plasma etching process forms an optically smooth surface, limiting the amount of scattering. As mentioned above, the use of a "dielectric/air" interface also minimizes the possibilities of scattering and reflection. Moreover, a follow-on coating process may be used to deposit an anti-reflective material along facet 22; again performed as a wafer-level process.

Figure 4:
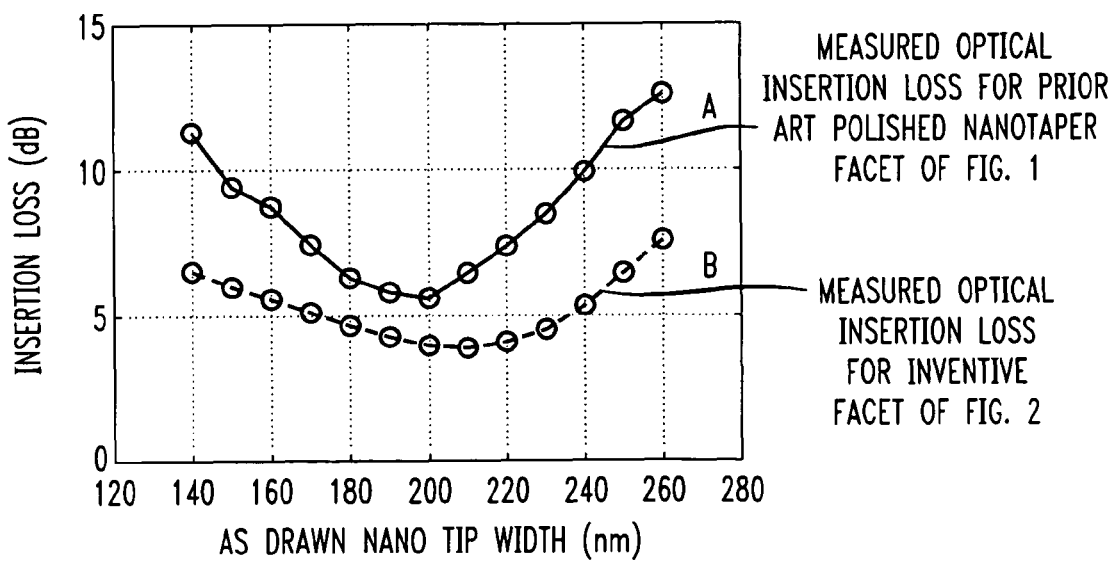
FIG. 4 is a graph illustrating the improvement in coupling efficiency between the prior art arrangement of FIG. 1 and the inventive structure of FIG. 2.

FIG. 4 is a graph of insertion loss as a function of nanotaper tip width (measured in nm). Curve A is associated with the prior art arrangement of FIG. 1 (where the nanotaper tip is exposed at a polished endface of the SOI structure). The minimum insertion loss, on the order of 6 dB is associated with a nanotaper tip width of 200 nm. As the width either increases or decreases, the loss is seen to increase, reaching values of 12 dB or more. Curve B is associated with the structure of the present invention as illustrated in FIG. 2. As shown, the insertion loss plot is flatter than that of the prior art and again exhibits the minimum loss at a tip width of about 200 nm, in this case having a value of about 4 dB—a 2 dB improvement over the prior art. As the tip width either increases or decreases, the loss increases at a slower rate than the prior art and, in any case, does not exceed a value greater than about 7 dB.

There are many instances where there is a need to redirect any remaining reflected signals from re-entering the incoming signal path. As will be discussed in detail below in association with FIGS. 10-13, any arrangement which incorporates a laser source would benefit from redirecting reflected signals away from the laser cavity. In accordance with the present invention, therefore, a plasma etching process may be used to particularly angle the coupling facet to re-direct any reflected signals away from the active region of the laser source.

Figure 5:
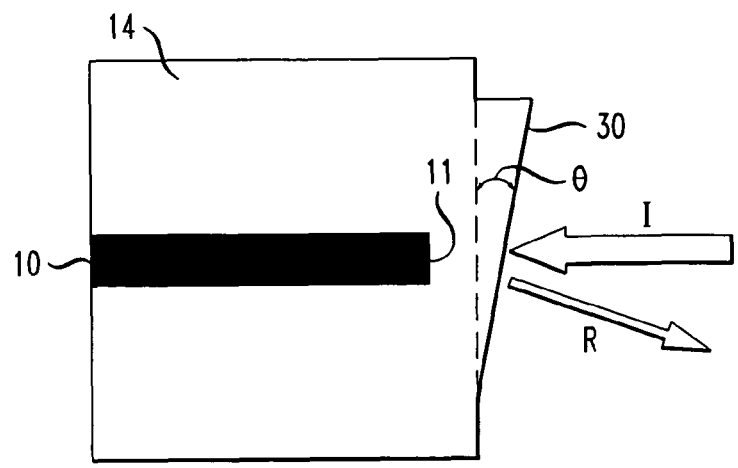
FIG. 5 contains a top view of an alternative embodiment of the present invention, in this case for use with a standard optical waveguide endface (that is, not a nanotaper coupler) and comprising a front-to-back angled facet, created with a etching process.

FIG. 5 illustrates an exemplary embodiment of the present invention which provides reflected signal re-direction. FIG. 5 is a top view of the embodiment, illustrating the coupling of an optical signal into an endface 11 of optical waveguide 10; no nanotaper transition region is utilized in this particular embodiment (it is to be understood, however, that any embodiment may or may not include a nanotaper transition region, at the discretion of the user). As shown, an angled coupling facet 30 is created which will successfully re-direct any reflected signal (shown by arrow "R") out of the signal path of the incoming optical signal (shown by arrow "I"). In this particular embodiment, the angled surface is created from "front to back" along the top surface of the substrate. The illustrated angle θ is selected to be sufficient to ensure that the reflected signal will propagate away from angled coupling facet 30, while not unduly limiting the coupling efficiency into endface 11 of waveguide 10. Advantageously, the use of angled coupling facet 30 also eliminates the need to apply an anti-reflective (AR) coating on the facet, saving both fabrication time and expense.

Figure 6:
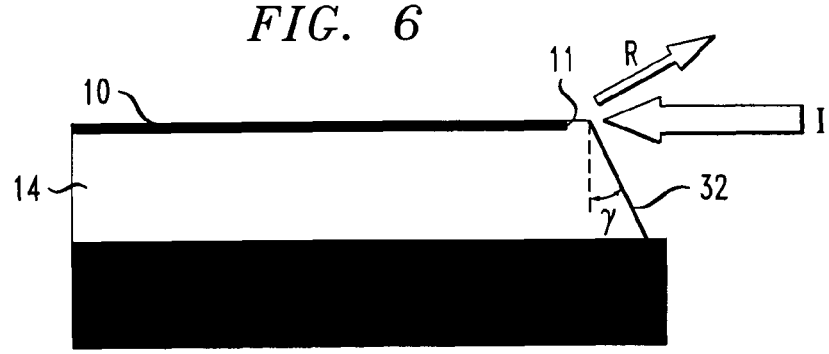
FIG. 6 is a side view of an alternative angled facet arrangement of the present invention, in this case with the angle created in the plane of the substrate endface.

An angled facet may also be formed in the vertical direction, as shown in the embodiment of FIG. 6. In this case, a downwardly angled facet 32 is formed using an etching process in accordance with the present invention. As shown, an incident ray I will be directed through the waveguide cladding material and couple into endface 11 of optical waveguide 10. Reflected ray R is shown as directed upward at an angle, away from the incoming optical axis. In the particular embodiment shown in FIG. 6, angled facet 32 is formed at an angle γ, controlled by the fabricator for the intended purpose of the device.

Figure 7:
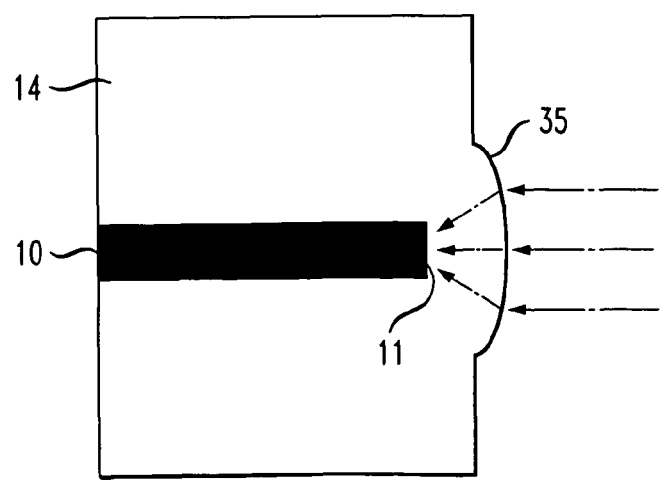
FIG. 7 is a top view of yet another embodiment of the present invention, illustrating the formation of an etched curvature along the substrate endface to form a lensed coupling facet.

A significant benefit of using etched coupling facets in accordance with the present invention is that the contour of the facet may be photolithographically controlled to create any desired geometry. FIG. 7 is a top view of an exemplary embodiment of the present invention illustrating this advantage, where a focusing lens 35 is formed by etching a properly-contoured curvature along the endface of the optical substrate. As indicated by the arrows, an incoming collimated signal will be focused by lens 35 into the center portion of optical waveguide 10 at endface 11. The reciprocal nature of this arrangement—as well as every other embodiment of the present invention—will allow an outgoing signal propagating along waveguide 10 to be transformed into a collimated signal as it exits the optical substrate.

Figure 8:
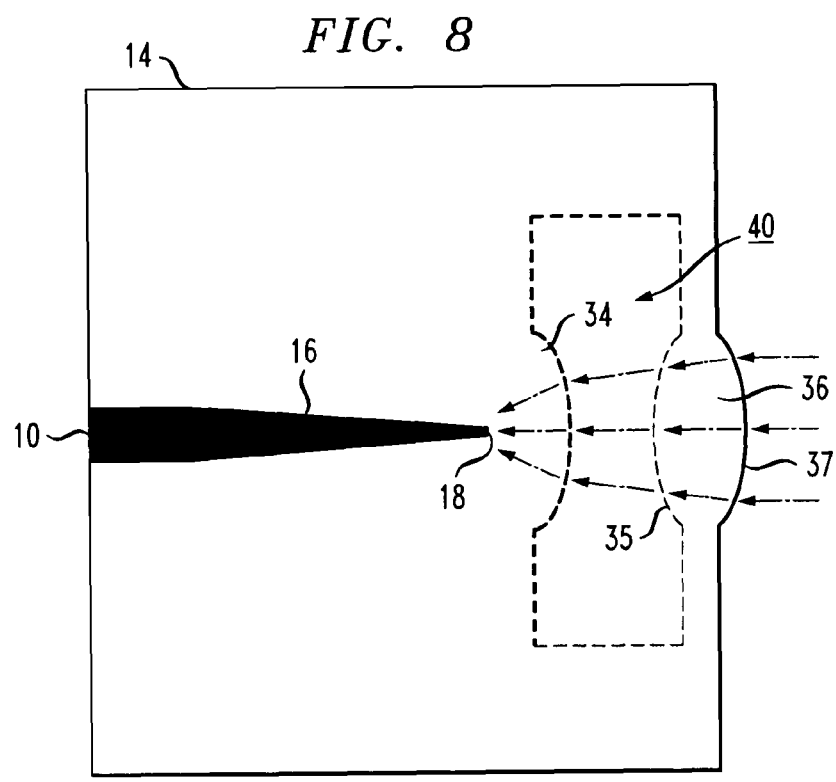
FIG. 8 illustrates a compound lensed coupling facet formed using a pre-defined pattern and subsequent etch process to create each desired contour along the optical axis between the waveguide and substrate endface.

Inasmuch as etching is a process which can be controlled by a photolithographic process to create various geometries, it is possible to form multiple components as a "coupling facet" between an optical waveguide and a free space optical signal. FIG. 8 is a top view of an exemplary multi-component coupling facet, including a set of etched contours specifically patterned to form a first, focusing lens 34 and a second, collimating lens 36. In this particular embodiment, waveguide 10 is formed to include nanotaper transition region 16, terminating at nanotaper tip 18. A cavity 40 is created through the waveguide cladding material using a pattern and etch process that is controlled to create the necessary contours associated with focusing lens 34 and a first surface 33 of collimating lens 36. In particular, a photolithographic mask having the contour of cavity 40 is created on the surface of the waveguide cladding material. Thereafter, the exposed area is removed using a suitable etchant, leaving cavity 40 (which will advantageously exhibit the desired optically smooth surfaces). Outer surface 37 of collimating lens 36 is also contoured using an etch process to provide the desired coupling facet geometry.

Figure 9:
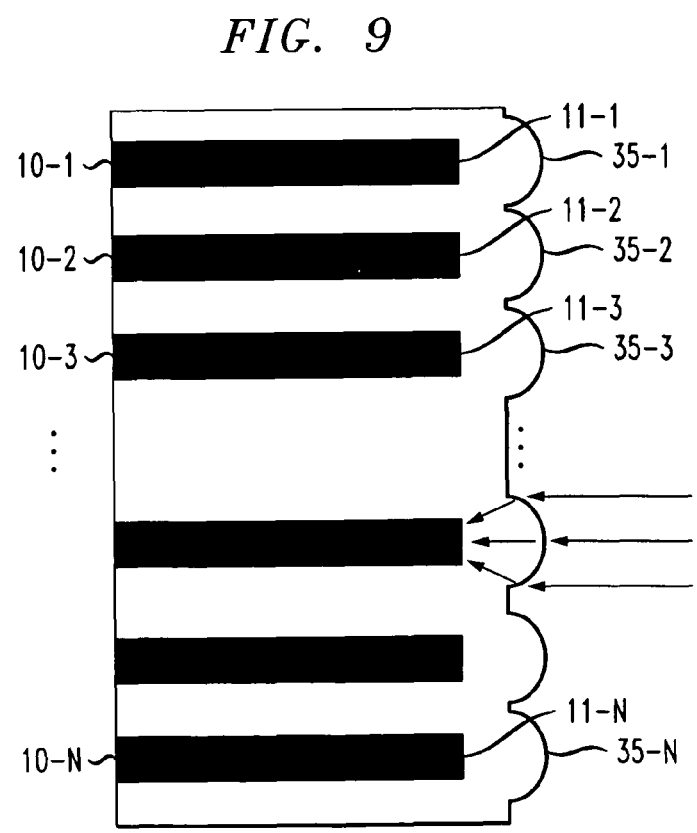
FIG. 9 is a top view of an array embodiment of the present invention, in this case with a plurality of curved facets formed with an etch process in a manner where each facet is aligned with a separate waveguide within a waveguide array.

By virtue of using a conventional photolithographic patterning and etching technique to form coupling facets in accordance with the present invention, a plurality of such facets may be formed along a single endface for use with an array of optical waveguides. FIG. 9 is a top view of one exemplary array embodiment of the present invention, in this case illustrating a plurality of waveguides 10-1, 10-2, 10-3, . . . , 10-N utilizing a plurality of etched lenses 35-1, 35-2, 35-3, . . . , 35-N formed in the same manner as the embodiments described above. Advantageously, a single patterning step may be used to define the shape and location of the plurality of etched lenses 35-1 through 35-N, providing alignment between the focal point of the lenses and endfaces 11-1 through 11-N of waveguides 10-1 through 10-N. The ability to replicate the same lens geometry across the array is seen to be a significant advantage of the use of etched coupling facet preparation in accordance with the present invention. While not shown, it is to be understood that an angled facet may be used with an array waveguide structure (instead of the illustrated lensed facet). In this case, both the facet angle and the angle of the waveguide array with respect to the substrate surface) can be controlled to provide optimum coupling (see FIG. 13, below, for an illustration of an angled facet and an angled waveguide).

As mentioned above, prior art arrangements for coupling light from a laser source into a nanotaper waveguide often encounter stability problems. In many cases, a separate micro lens is placed in the optical path between the laser and the nanotaper. Unfortunately, both the lens and the nanotaper tip will reflect a portion of the incoming laser signal. A significant portion of the reflected signal has been found to be coupled back into the active region of the laser, resulting in the instability of the laser.

Figure 10:
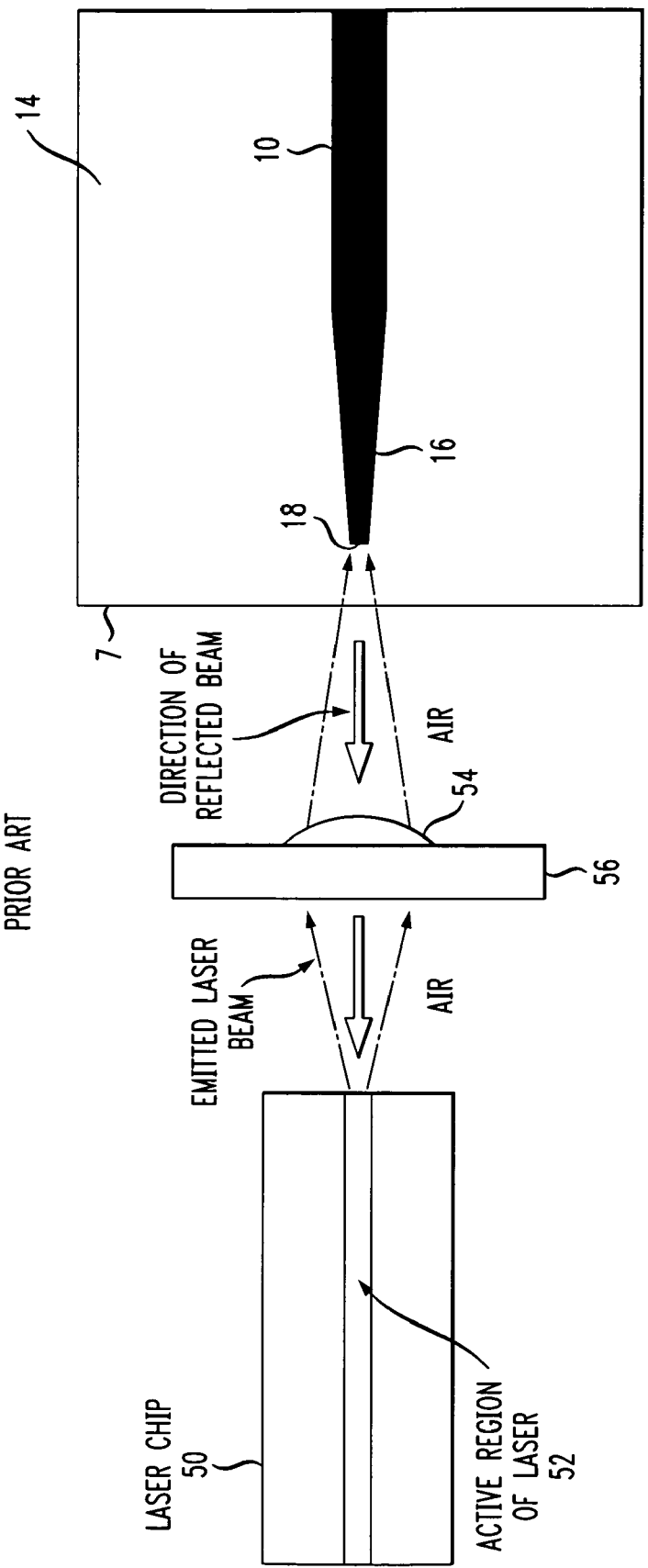
FIG. 10 is a top view of a prior art optical system including an off-chip laser transmitter and focusing element as used in conjunction with a nanotaper waveguide formed on an optical substrate, indicating problems associated with reflections that will be re-directed back into the laser component.
Figure 11:
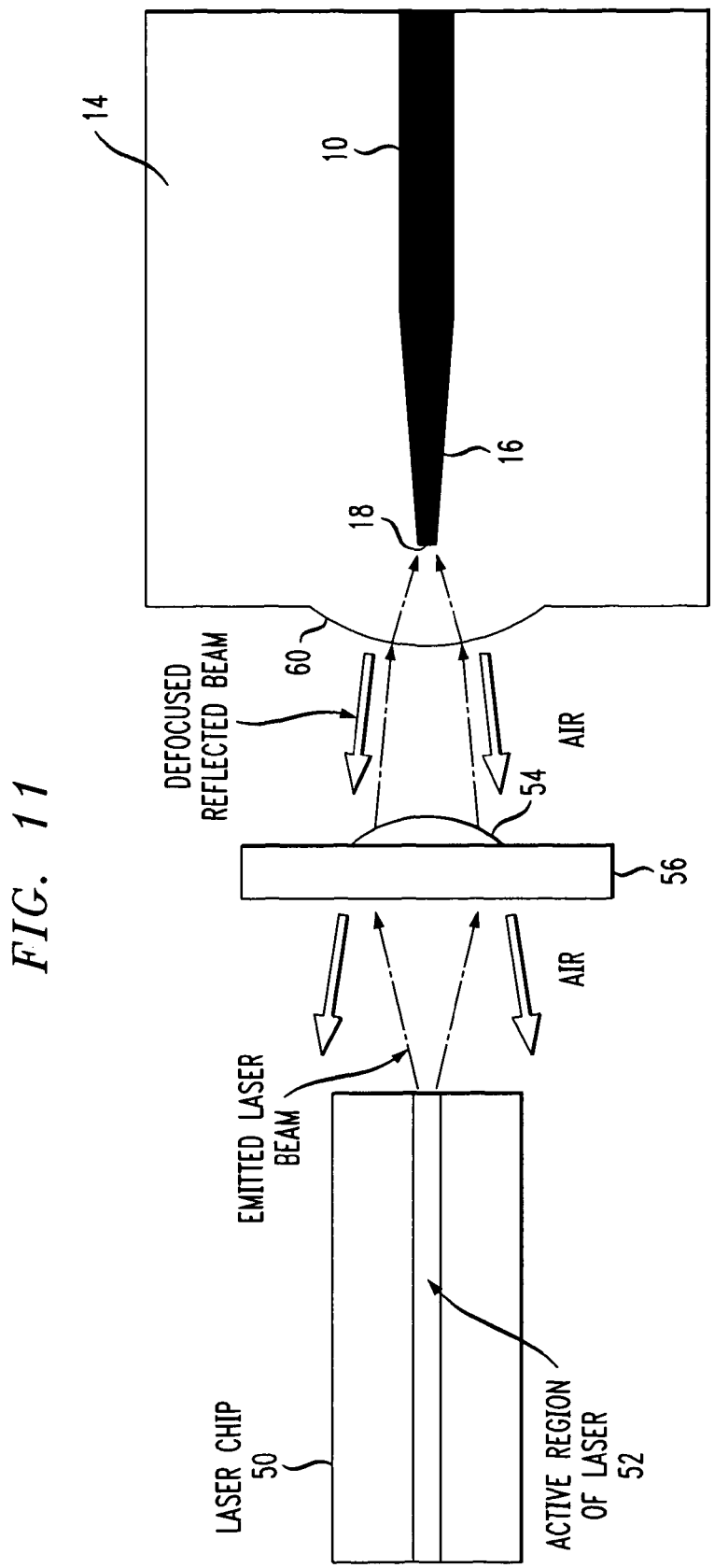
FIG. 11 is a top view of an arrangement of an optical system formed in accordance with present invention where the endface facet of the optical substrate is contoured by an etch process to de-focus any reflected signal and direct it away from the active region of the laser transmitter.

FIG. 10 is a top view of a prior art arrangement which exhibits this instability problem. As shown, a laser chip 50 including an active region 52 is activated to emit an output beam which then propagates through the air and encounters a microlens element 54 held within a support element 56. Microlens 54 functions to focus the emitted beam toward nanotaper tip 18 of waveguide 10, as shown. Inasmuch as prior art coupling facet 7 is formed by using, for example, a polishing process, a significant portion of the incoming beam will be reflected, shown by arrow labeled "Direction of reflected beam" in FIG. 10. The on-axis component of this reflected beam will pass unimpeded through microlens 54 and re-enter active region 52 of laser 50, as shown.

In accordance with the teachings of the present invention, a coupling facet having an etched contour can be formed along the endface of the optical substrate to minimize the optical energy directed back into the laser source. In the particular embodiment of FIG. 11, the etched coupling facet is shown as exhibiting a contour that will function as a lens 60. As discussed above, the patterning of the endface is determined in conjunction with the parameters of the waveguide so as to focus the incoming laser beam into tip 18 of nanotaper 16. Advantageously, the curvature of lens 6b also re-directs any reflected portions of the beam away from the optical axis of the system (that is, "de-focuses" the reflected beam). The optical design parameters (e.g., focal length) of lens 60, in combination with the optical parameters of microlens 54, are chosen to optimize the coupling of the incident laser beam into nanotaper tip 18 while simultaneously scattering the reflected signal away from active region 52.

Figure 12:
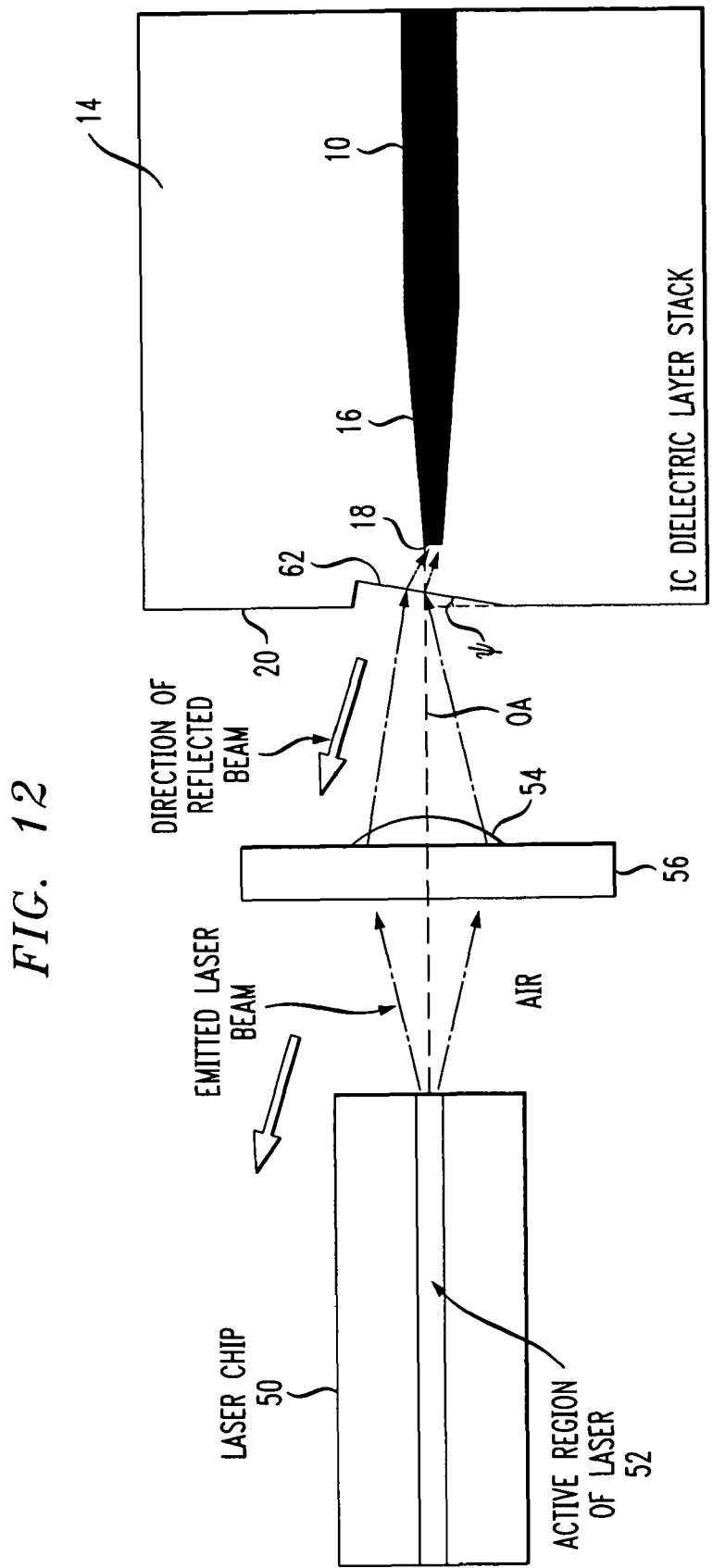
FIG. 12 is a top view of an alternative optical system of the present invention, formed to include an angled facet formed using an etch process to direct a reflected beam away from the optical axis.
Figure 13:
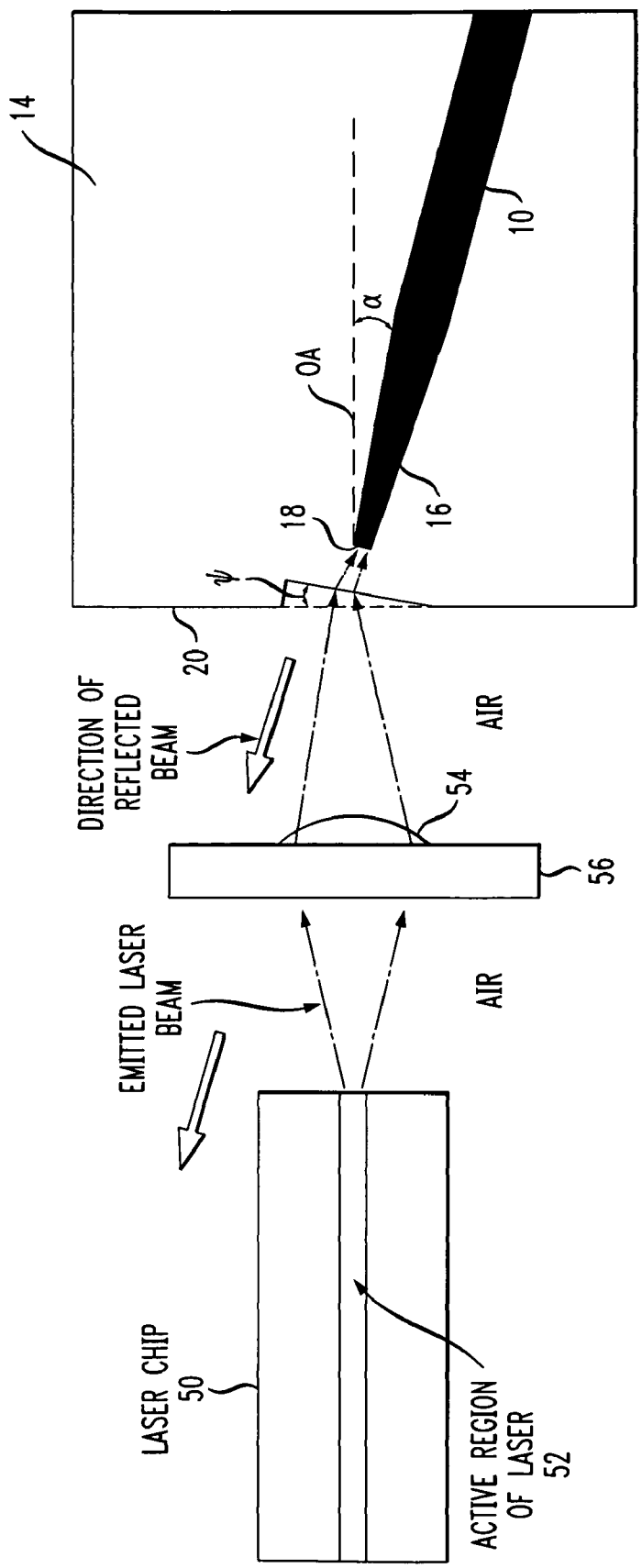
FIG. 13 illustrates an alternative embodiment of the configuration of FIG. 11, in this case where the nanotaper is angularly disposed to improve coupling efficiency.

An alternative laser-based system using a contoured etched facet of the present invention is shown in FIG. 12. In this case, an angled facet 62 is formed along endface 20 of the optical substrate. In this particular embodiment, the angled facet is formed as recessed within the optical substrate from endface 20 (in contrast to the angled facets illustrated above, which are shown as "notches"; either geometry is suitable for any embodiment of the present invention). The angle ψ is selected to re-direct the reflected signal beyond the capture angle of microlens 54, as shown in FIG. 12. In order to still capture a majority of the incoming laser beam, waveguide 10 is formed to be slightly offset from the optical axis OA of the system. Improved coupling efficiency may be found by rotating the disposition of waveguide 10 so as to better align with the incoming beam. FIG. 13 illustrates this configuration, where waveguide 10 (and associated nanotaper 18) is disposed at an angle of α with respect to optical axis OA.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An arrangement for providing end-fire optical coupling between a free-space optical signal propagating along an optical axis and an optical waveguide incorporated within an optical substrate, the optical waveguide formed within a silicon surface layer of the optical substrate and the coupled light provided through an endface of the optical substrate, wherein the arrangement comprises:
an optical waveguide disposed within the silicon surface layer such that an end portion thereof is pulled back by a predetermined distance from a vertical endface of said optical substrate; and
a plasma-etched, optically smooth coupling facet formed along the vertical endface of the optical substrate for directing the free-spacing propagating optical signal into the optical substrate, the propagating optical signal thereafter being coupled into the end portion of the pulled back optical waveguide, the plasma-etched, optically smooth coupling facet also for re-directing reflected signals away from the optical axis.

2. An arrangement as defined in claim 1 wherein the plasma-etched, optically smooth coupling facet comprises an angularly-etched coupling facet.

3. An arrangement as defined in claim 2 wherein the angularly-etched, optically smooth coupling facet is formed in a direction orthogonal to the optical axis and across a top surface of the optical substrate.

4. An arrangement as defined in claim 2 wherein the angularly-etched, optically smooth coupling facet is formed in a direction orthogonal to the optical axis and through the thickness of the optical substrate.

5. An arrangement as defined in claim 2 wherein the optical waveguide is angularly disposed across the surface of the optical substrate to optimize optical coupling efficiency with the angularly-etched, optically smooth coupling facet.

6. An arrangement as defined in claim 1 wherein the etched coupling facet comprises a curved coupling facet.

7. An arrangement as defined in claim 6 wherein the curved coupling facet comprises a single contour etched across the endface of the optical substrate.

8. An arrangement as defined in claim 6 wherein the curved coupling facet comprises a plurality of separate contours etched between the end portion of the optical waveguide and the endface of the optical substrate.

9. An arrangement as defined in claim 1 wherein the optical substrate comprises an SOI structure and the optical waveguide comprises a silicon waveguide.

10. An arrangement as defined in claim 1 wherein the optical waveguide comprises a material selected form the group consisting of silicon, silicon oxynitride, and silicon nitride.

11. An optical transmitter including
a laser source for generating an optical signal;
at least one focusing lens for receiving the optical signal from the laser source and directing the propagation thereof along an optical axis as a free-space optical signal; and
an optical substrate including an optical waveguide integrated therein, the optical substrate further comprising a plasma-etched, optically smooth endface forming a contoured coupling facet between the laser source and a terminating end portion of the optical waveguide, the terminating end portion of the optical waveguide pulled back away from the optically smooth endface, and the contoured coupling facet configured to direct the free-space propagating optical signal into the pulled back terminating end portion of the optical waveguide and re-direct any reflected optical signal away from the optical axis.

12. An optical transmitter as defined in claim 11 wherein the plasma-etched, optically smooth coupling facet comprises an angularly-etched coupling facet.

13. An optical transmitter as defined in claim 12 wherein the optical waveguide is angled with respect to the optical substrate to improve coupling efficiency with the laser source through the angularly-etched, optically smooth coupling facet.

14. An optical transmitter as defined in claim 12 wherein the angularly-etched, optically smooth coupling facet is formed in a direction orthogonal to the optical axis and across a top surface of the optical substrate.

15. An optical transmitter as defined in claim 12 wherein the angularly-etched, optically smooth coupling facet is formed in a direction orthogonal to the optical axis and through the thickness of the optical substrate.

16. An optical transmitter as defined in claim 12 wherein the etched coupling facet comprises a curved contour to create a lensed coupling facet.

17. A wafer formed to include a plurality of end-fire optical coupling arrangements, each end-fire optical coupling arrangement comprising
an optical waveguide integrated therein with an end portion of the optical waveguide pulled back from a vertical endface of an end-fire optical coupling arrangement; and
a plasma-etched, optically smooth coupling facet formed along the vertical endface thereof for directing a free-space propagating optical signal along an optical axis and into the pulled back an end portion of the optical waveguide and re-directing reflected signals away from the optical axis.

18. A wafer as defined in claim 17 wherein at least one optical coupling arrangement comprises
a laser transmitter source for generating an optical signal;
at least one focusing lens for receiving the optical signal from the laser source and directing the propagation thereof along the an optical axis; and
an optical substrate including an optical waveguide integrated therein, the optical substrate further comprising a plasma-etched, optically smooth endface forming a contoured coupling facet between the laser source and the pulled back terminating end portion of the optical waveguide, the contoured coupling facet configured to re-direct any reflected optical signal away from the optical axis.

* * * * *